C. T. RAY.
CULTIVATOR.
APPLICATION FILED JULY 5, 1917.

1,304,512.

Patented May 20, 1919.
3 SHEETS—SHEET 1.

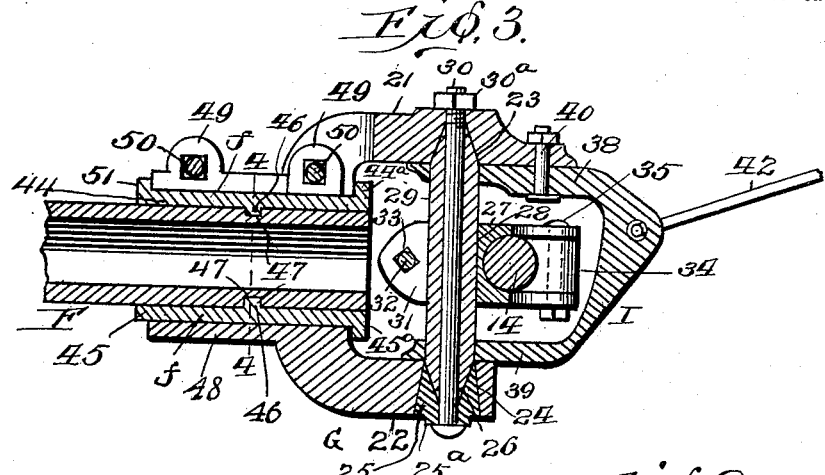

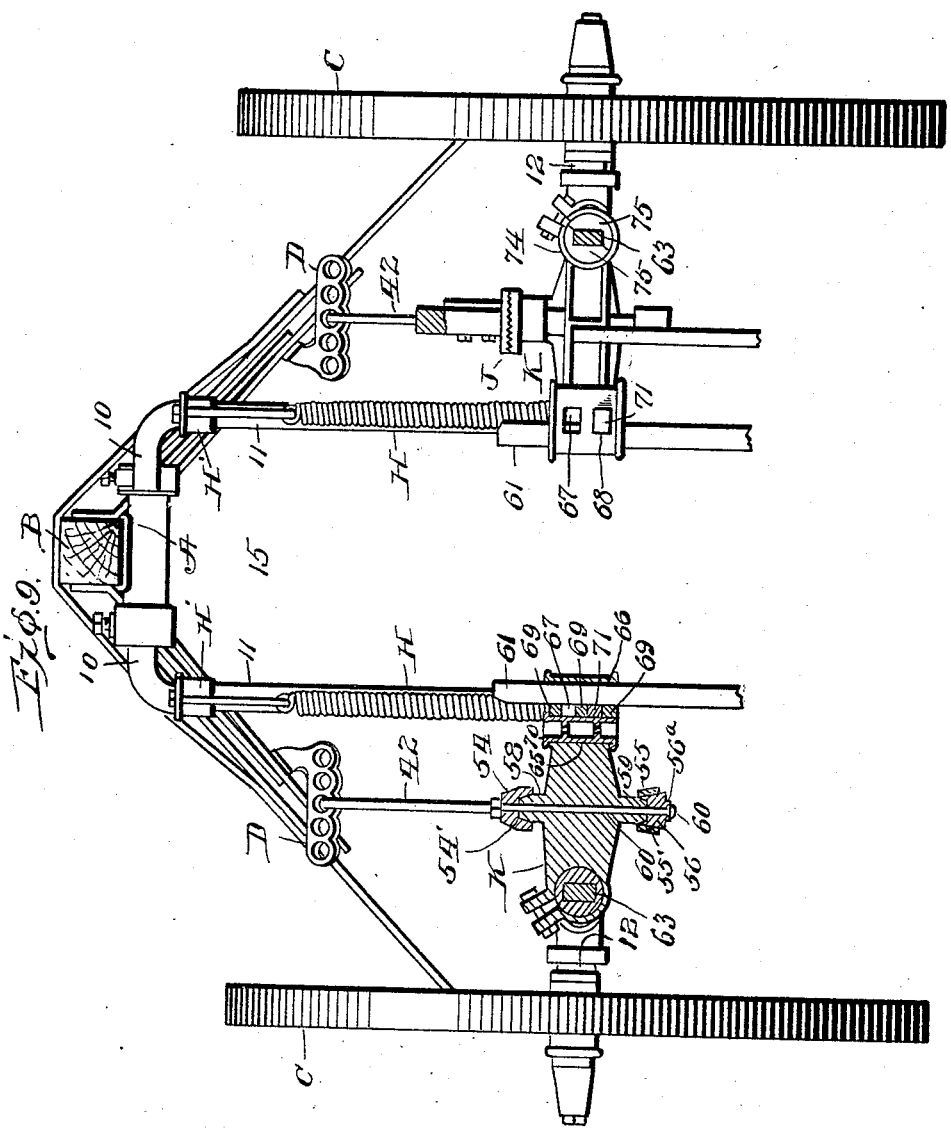

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

CULTIVATOR.

1,304,512.     Specification of Letters Patent.     Patented May 20, 1919.

Original application filed June 20, 1912, Serial No. 704,782. Divided and this application filed July 5, 1917. Serial No. 178,606.

*To all whom it may concern:*

Be it known that I, CHARLES T. RAY, a citizen of the United States, residing at Louisville, in the county of Jefferson and State of Kentucky, have invented certain new and useful Improvements in Cultivators, of which the following is a specification.

This application is a division of my application for Letters Patent of the United States, filed June 20, 1912, Serial No. 704,782 for improvements in cultivators. It particularly relates to the beam and to the means of connection of the tillage elements therewith.

In the accompanying drawings, wherein like characters of reference denote corresponding parts in the several views:—

Fig. 3 is a detail vertical longitudinal section on the line 3—3 of Fig. 2, showing the coupling and clevis at the forward end of the beam;

Fig. 4 is a detail cross section through the forward end of the beam and sleeve, on the line 4—4 of Fig. 3;

Fig. 5 is a detail perspective view of the cross head;

Fig. 6 is a detail view of the wedge block 70;

Fig. 7 is a detail view of the wedge key 71;

Fig. 8 is a detail sectional view on the line 8—8 of Fig. 2; and

Fig. 9 is a rear view of a straddle row cultivator embodying the present improvements, showing some of the parts in section, others in elevation and still others broken away.

Figure 1:
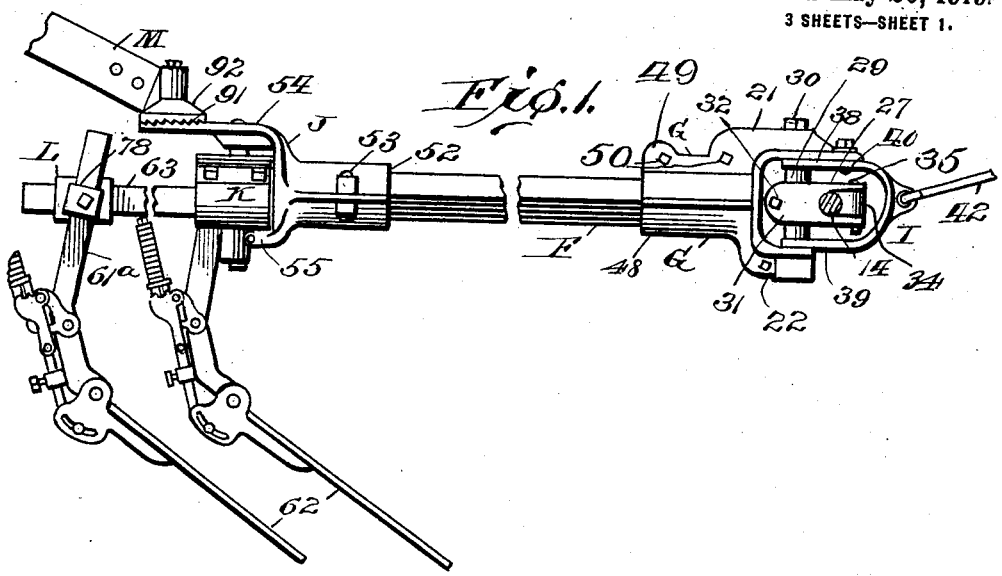
Figure 1 is a side view of a cultivator beam and its attachments embodying the improvements constituting the present invention.

The illustrated embodiment of the invention will be described somewhat restrictively in detail, but it is not intended thereby to restrict the invention to the particular details of the illustrated embodiment, as the latter is merely exemplary and the invention may be otherwise and variously embodied without departing from its spirit or the scope of the subjoined claims.

Fig. 9 illustrates a straddle row cultivator having a saddle A which is connected to the pole or tongue B and in which saddle the inwardly extending ends 10, 10 of arch members 11, 11 of the arched axle are journaled. The arched axle also has outwardly extending spindles 12, 12 upon which the carrying wheels C, C are mounted. These spindles 12 may be directly on the ends of outwardly extending portions 14 of the axle, or may be set rearward of said portions 14, as desired. As each of these forms is old and neither is in anywise essential to this invention, further reference thereto need not herein be made. Suitably supported by intermediate elements connected to the tongue or pole B are front clevises D, D. These clevises and their supporting means are preferably of the construction illustrated in my parent application, and for this reason and because their details form no essential part of this invention, they will not be further described herein.

When the parts constituting the essence of the present invention are embodied in a straddle row cultivator there are two suspended beams with adjunctive devices for supporting tillage elements, at opposite sides of the longitudinal center of the implement, but as these parts are duplicates of each other a description of those at one side of the implement will suffice for both, as follows:

F designates a gang beam having a forwardly projecting coupling G secured to its front end. The forward end of this coupling is provided with upper and lower arms 21 and 22 arranged respectively above and below the outwardly-extending portion 14 of the arched axle at this side of the implement. As shown best in Fig. 3, arm 21 of the coupling has a socket 23 which is tapered for a portion of its length, while the arm 22 has a tapered opening 24 within which there is fitted a hollow externally-tapered plug 25 which for a portion of its length is internally tapered in a direction the reverse of the taper of the socket 23, said internally-tapered portion of the plug forming a socket 26. Upon the portion 14 of the axle there is a sleeve 27 having an opening 28 alined with the sockets 23 and 26 of the coupling: 29 designates a hollow post having tapered ends seated in the sockets 23 and 26. Suitable means (as a headed bolt 30 having a nut 30ᵃ, the bolt extending through the hollow post 29 and plug 25 and to the outer surfaces of the arms 21 and 22) holds the parts together.

The plug 25 being removably fitted to an opening in the coupling, permits the parts to be readily assembled and taken apart, and the tapered surfaces of the post and sockets afford adequate provision for the taking up of wear. Preferably one end of the plug protrudes from the arm 22 of the coupling, as shown at 25$^a$, and this protruding part is of suitable form, as square, to be engaged by an appropriate tool for inserting it into or removing it from the opening 24.

The post 29 extends through the opening 28 in the sleeve 27 and is fixed to the member 14 of the axle by the said sleeve.

Accordingly, it will be seen that the beam F is mounted to have free swinging movement on a substantially vertical axis (i. e., around the post 29) arranged in advance of its forward end.

Provision is also made for a relative adjustment vertically of the sleeve 27 and post 29, this adjustment varying the height of the forward end of the beam. To this end, the sleeve 27 is provided rearward of its opening 28 with flanges 31 which form rearwardly projecting lips on opposite sides of the post 29, and suitable means, as a bolt 32 extending through openings 33 in the lips or flanges and having an appropriate nut, is employed to draw the lips or flanges together and hold them to thereby clamp the sleeves and posts together. Obviously, when the nut on the bolt has been slackened, the clamping effect referred to will cease, and a relative adjustment of the beam and sleeve may then be effected, which will vary the height of the forward end of the beam with reference to the ground and hence vary the depth of penetration of the tillage elements on the beam.

The sleeve 27 is preferably open along its forward side for convenience in inserting it upon and removing it from the member 14 of the axle, and coöperating elements, as the spaced blocks 34 at the ends of the sleeve, having concave surfaces conforming to the axle, are employed to provide for pivotal movement of the axle within the sleeve and to enable the sleeve to be most conveniently and quickly mounted upon the axle. The blocks 34 are suitably secured to the sleeve, as by bolts 35, for example.

The sleeve is also provided with a downwardly and rearwardly extending arm 36 to which the lower end of a spring H is secured. The upper end of this spring is suitably connected to a bracket H′ here shown as extending from the axle member 11. This spring yieldably supports the beam F.

I designates a clevis having rearwardly extending arms 38 and 39. These arms are arranged respectively above and below the sleeve 27 and between the latter and the arms 21 and 22 of the coupling. They are pivotally mounted on the post 29 whereby the clevis may be adjusted upon a vertical axis about the post 29. The clevis, after being adjusted is fixedly secured to the coupling by a suitable device, as the bolt 40, for example, which extends through a slot 41 (Fig. 2) formed in the upper arm 21 of the coupling. A draft rod 42 has its rear end connected to the forward end of the clevis I and its forward end connected to the clevis D. As thus far described the parts are shown, described and claimed in my parent application, hereinbefore identified, and the particular construction thereof herein illustrated forms no part of the invention constituting the essence of the present application.

The beam F is preferably hollow and square, or other suitable polygonal form, in cross section. Its forward end is provided with a sleeve $f$ which is externally round and internally of shape conforming to the external shape of the beam. This sleeve is interposed between the beam and coupling G and may be turned axially in the coupling, and hence it follows that the polygonal beam, which is fixed to the sleeve, may be turned axially with relation to the coupling. Preferably, the sleeve, as clearly shown in Figs. 3 and 4, is formed of two complementary members 44 and 45 having flanges 44$^a$ and 45$^a$ at their forward ends and provided internally with projections 46. The projections 46 enter recesses 47 in the beams and hold the sleeves against turning upon the beams. The coupling G is mounted on the sleeve and for this purpose is provided rearwardly of its bifurcated forward end with a tubular portion 48 which preferably is split longitudinally for convenience in mounting it on the sleeve. The tubular portion 48 has suitable provision (the ears 49 and bolts 50, for example) for clamping its sections together, tightly around the sleeve. The flanges 44$^a$ and 45$^a$ of the sleeve sections engage the surface of the coupling within the bifurcated portion of the latter and prevent longitudinal displacement of the sleeve in one direction. Longitudinal displacement of the sleeve in the opposite direction may be prevented by forming the rear end of the member 44 with a lug 51 to engage the rear end of the coupling.

The rear end of the beam F is provided with a coupling J whose forward end 52 is fixedly secured thereto, said forward end being preferably split longitudinally and drawn tightly to place around the beam by suitable means, as bolts 53 for example. This coupling is bifurcated, having upper and lower arms 54 and 55. A cross head K is pivotally mounted between these arms.

The upper arm 54 has a conical socket 54' like the socket 23 in the coupling G and the lower arm 55 has a tapered opening 55' provided with a removable hollow plug 56 with protruding squared end 56ª similar to the opening 24 and pivot bearing 25 of the front coupling. The socket 54' and plug 56 form bearings for projections 58 and 59, which extend from the cross head K and have conical ends which are seated in said socket and plug, said projections thereby forming pivots by which the cross head may be swung on a vertical axis within the rear coupling. These pivots preferably are hollow and a suitable device, as a bolt 60 for example, extends through the same and holds the parts together: this formation also providing for the taking up of wear in the contacting surfaces while the removable plugs permit of easy assemblage.

At one end of the cross head K there are two chambers 65 and 66 which are open at top and bottom. Each of these chambers is wider at one side than the other, the wider side of one being adjacent the narrower side of the other. The division wall between these chambers is also divided transversely of the cross head by apertures 67 and 68 which pass through the sides of the cross head. Preferably, the division wall referred to is formed by three spaced ribs, 69, which extend diagonally and are arranged one above another, the spaces between the ribs registering with the openings at the opposite sides of the cross head. Either chamber 65, 66 is adapted to receive a standard 61 having a suitable soil treating element, as the shovel 62, for example, and either of said chambers is likewise adapted to receive a block 70 having a plane surface 70ª and a diagonal surface 70ᵇ: the standard being mounted in one chamber and the block in the other chamber. Provision for adjusting the standard and its soil treating element longitudinally of the cross head—i. e. transversely of the implement—is thereby made. A wedge key 71 having a tapered face 71ª corresponding to the diagonal surface 70ᵇ of the block and a plane face 71ᵇ corresponding to the plane surface of the standard, is inserted through either of the openings 67, 68, the diagonal surface of the key engaging the diagonal surface of the block and the plane surface of the standard, the key in conjunction with the block thereby effectively holding the standard in adjusted position, while permitting the latter readily to be adjusted vertically within or wholly removed from the chamber.

The wedge key 71 preferably has a threaded outer end 71ᶜ which receives a nut 72 which bears against the cross head and serves when turned to draw the key tightly to place or to slacken it. The wedge block is preferably made hollow and with cross ribs 70ᶜ (see Fig. 6) for purpose of lightness and strength.

The other end of the cross head has a cylindrical split socket 74 the opening 70 through which extends in the general direction of the length of the implement. This socket is provided with a longitudinally-divided sleeve formed of complementary members 75, 75, formed to provide an internal angular opening to receive the forward end of an extension arm 63 which is adjustable longitudinally therein and is removable therefrom, and is held in position by suitable means—as, for example, clamping bolts 80 74ª extending through lips or flanges of the socket.

The sleeve formed by said members 75, 75 is externally round, and the socket 74 is internally of like shape, whereby said sleeve and extension arm may be turned within the socket.

L designates a bracket which is removable from and adjustable longitudinally upon the extension arm 63. This bracket has a longitudinal opening 77 through which the extension arm 63 extends, and also has a chamber 78 through which a standard 61ª extends and a chamber 79 for a wedge key 80. The chamber 78 is inclined to the vertical, to hold the standard at a corresponding inclination, and is arranged at one side of the opening 77, while the chamber 79 is of tapered conformation and is on the other side of the opening 77. The wedge key 80 and a set screw 81 serve to clamp the standard 61ª in adjusted position upon its support, which support in the present exemplification of the invention is the extension arm 63. In the drawings the wedge block engages the extension arm and the set screw engages the standard, but the position of the parts may be reversed, as is obvious.

Figure 2:
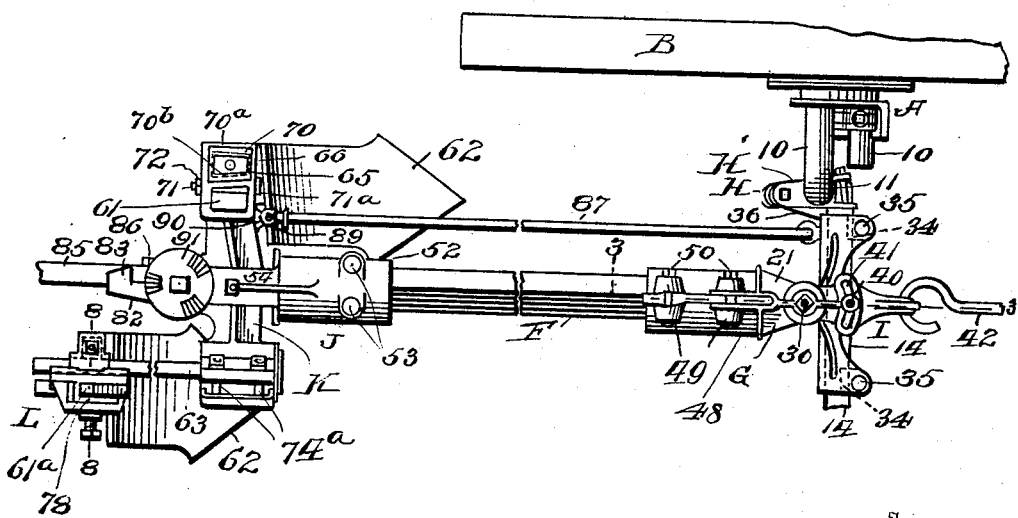
Fig. 2 is a plan view of the same, showing also a part of the tongue or pole.

Provision is also made for a removable standard 85 at the center of the cross head Fig. 2, to carry a shovel or other suitable soil treating element. In the exemplified arrangement the cross head is provided with a rearwardly-extending lug 82 having upper and lower lips or flanges 83 and the cross head has lips or flanges 84 at its top and bottom, adjacent to the forward end of the flanges 83. The standard 85 has a forwardly extending end which lies alongside the lug 82, within the space between the lips or flanges 83, and projects into the space between the lips or flanges 84, and is held from displacement by said flanges. Suitable means, as a bolt 86, extends through the lug 82 and forwardly extending end of the standard 85 and secures these parts together.

87 designates a rod whose front end is attached to a rearward projection from the sleeve 27 and whose rear end is pivotally attached by a knuckle 89 to a lug 90 projecting from the cross head. This rod is parallel to the beam F and acts to preserve the proper relation of the cross head and tillage elements with respect to the line of draft, in the various positions of horizontal pivotal adjustment of the beam F around the post 29.

The rear end of the upper arm 54 of the gang coupling J is preferably formed with a circular plate 91 which forms a member of a dial coupling for adjustably connecting the handle M to the arm 54, the other member of the dial coupling being designated 92.

Having thus described the invention what I believe to be new and desire to secure by Letters Patent is:—

1. In a tillage implement, a beam, a head carried by the beam and provided with a plurality of chambers adjacent to each other, a standard adapted to either of said chambers, and thereby adjustable to selected positions upon the head, and means for securing the standard in its selected position, including an element similarly adapted to either chamber, said standard and element being so correlated that the standard will be in one chamber and the element in the other.

2. In a tillage implement, a beam, a head carried by the beam and provided with a plurality of chambers and with an apertured wall between said chambers, a standard adapted to either of said chambers and thereby adjustable to selected positions upon the head, and means for securing the standard in its selected position comprising an element similarly adapted to either chamber, and a second element extending into the aperture in the wall between the chambers.

3. In a tillage implement, a beam, a head carried by the beam and provided with a plurality of chambers and with an apertured wall between said chambers, a standard adapted to one of said chambers, and means for securing the standard to the head, comprising coöperating elements one of which is mounted in the chamber adjacent that occupied by the standard and the other of which extends into the aperture in the wall between the standard and the first-mentioned element, said elements being relatively movable to release the standard.

4. In a tillage implement, a beam, a head carried by the beam and having a plurality of chambers each having one end larger than the other, the larger end of one chamber being adjacent to the narrower end of the other, a standard adapted to either chamber, a wedge block also adapted to either chamber, the wedge block being mounted in one chamber and the standard in the other, means coöperating with the wedge block for securing the standard, and a tillage element carried by the standard.

5. In a tillage implement, a head for supporting the standard of a tillage element, said head having a plurality of chambers adapted to receive the standard and said chambers being separated from each other by a wall which extends diagonally across the head and is apertured, the head having openings in its opposite surfaces and which register with the aperture in said wall, a standard adapted to be received by either chamber, a wedge block similarly adapted to be received by either chamber, and a wedge key, which extends within the aperture in the wall between the chambers and through the openings which register with said aperture.

6. In a tillage implement, a beam, a head carried by the beam and having a plurality of chambers extending therethrough and each larger at one end than the other, said chamber being arranged with the narrower end of one adjacent the wider end of the other and being separated from each other by an apertured dividing wall which extends diagonally across the head, the head also having openings registering with the aperture in said dividing wall, a standard adapted to be received by either chamber, said standard carrying a tillage element and having a plane surface, a block having a plane surface and a diagonal surface similarly adapted to either chamber, and a wedge key having a plane surface to engage the plane surface of the standard and a diagonal surface to engage the diagonal surface of the block, said key extending through the head, transversely of the latter, and being mounted in either aperture in the dividing wall.

7. In a tillage implement, a beam, a head carried thereby, an extension arm connected to the head, a standard for supporting a tillage element, a bracket mounted on the extension arm and having a chamber for the standard, and also having a second chamber, said chambers being at opposite sides of the extension arm, and the second chamber being tapered, and a wedge block mounted in the second chamber.

8. In a tillage implement, the combination with the beam and a transverse head mounted on the rear end of the beam, of an extension arm formed separately from the head and extending therefrom in substantially the direction of the length of the beam, means for securing the extension arm adjustably and removably to the head, a standard carrying a tillage element, and means for connecting the standard adjustably to the extension arm.

9. In a tillage implement, the combination with a beam and a transverse head mounted on the rear end of the beam, said head having a split socket, of a sleeve, means for securing the sockets in a clamped relation about the sleeve, an extension arm adjustably and removably connected to the head by said socket and sleeve, and a tillage element carried by the extension arm.

10. In a tillage implement, the combination with a beam and a transverse head mounted on the rear end of the beam, said head having a split socket, of a sleeve, means for securing the socket in a clamped relation about the sleeve, an extension arm adjustably and removably connected to the head by said socket and sleeve, a standard carrying a tillage element and means for adjustably securing the standard to the extension arm.

11. In a tillage implement, the combination with the beam having a head at its rear end, of an extension arm formed separately from the head and extending rearward therefrom and adjustable longitudinally with relation thereto, means for securing the extension arm in its adjusted position upon the head, a standard for a tillage element and means for securing the standard to the extension arm.

12. A tillage implement comprising an axle, a beam mounted at its forward end to swing relatively to the axle upon a substantially vertical axis, a head pivoted between its ends to the beam and extending at an angle thereto, means connected to the head for keeping it substantially parallel with the axle, an extension arm formed separately from the head and carried thereby and longitudinally adjustable relatively thereto, said extension arm being arranged at one side of the beam and extending rearward of the head, and standards provided with tillage elements, one of said standards being connected to the extension arm and the other connected to the head.

13. A tillage implement comprising an axle, a beam mounted at its forward end to swing relatively to the axle upon a substantially vertical axis, a head pivoted between its ends to the beam and extending at an angle thereto, means connected to the head for keeping it substantially parallel with the axle, an extension arm formed separately from the head and carried thereby and arranged at one side of the beam and extending rearward of the head, a tillage element having connection with the head at one side of the beam, a second tillage element and a connection between the second tillage element and the extension arm, said connection being adjustable longitudinally of the extension arm.

14. A tillage implement comprising an axle, a beam mounted at its forward end to swing relatively to the axle upon a substantially vertical axis, a head pivoted between its ends to the beam and extending at an angle thereto, means connected to the head for keeping it substantially parallel with the axle, an extension arm formed separately from the head and carried thereby and arranged at one side of the beam and extending rearward of the head, a tillage element having connection with the head at one side of the beam, a second tillage element, a standard carrying the second tillage element, and a connection in which the standard is adjusted in a substantially vertical direction and by which it is secured to the extension arm.

15. A tillage implement comprising an axle, a beam mounted at its forward end to swing relatively to the axle upon a substantially vertical axis, a head pivoted between its ends to the beam and extending at an angle thereto, means connected to the head for keeping it substantially parallel with the axle, an extension arm formed separately from the head and carried thereby and longitudinally adjustable relatively thereto, said extension arm being arranged at one side of the beam and extending rearward of the head, a standard carrying a tillage element and having connection with the head at one side of the beam, a second standard carrying a tillage element and a connection between the second standard and the extension arm, said connection being adjustable longitudinally of the extension arm and the standard being adjustable in a substantially vertical direction relatively to the connection.

16. In a tillage implement, a beam mounted at its forward end to swing upon a substantially vertical axis, a head at the rear end of the beam and extending laterally from the same and pivoted to swing upon a substantially vertical axis, a rod at one side of the beam and substantially parallel therewith and having its rear end pivoted to the head and its forward end pivoted to an element with relation to which the beam moves upon said vertical axis, a standard for supporting a tillage element, means by which the standard is secured in different selected positions along the length of the head at one side of the beam, an extension arm extending rearwardly from the head and arranged at the other side of the beam, a second standard for supporting a tillage element, and means for securing the second standard in different selected positions along the length of the extension arm.

17. In a tillage implement, having a support for the standard of a tillage element, the combination with said support, of means for securing the standard thereto comprising a bracket mounted on the support and having chambers at opposite sides of the support, one of said chambers receiving the standard, and a wedge adapted to the other chamber and engaging the side of the support opposite that engaged by the standard.

18. In a tillage implement, a beam, a head carried thereby and having a longitudinally split socket with a cylindrical opening therein, a longitudinally divided externally cylindrical sleeve mounted in the socket and formed with an opening which is angular in cross section, an extension arm conforming in cross section to the angular opening in the sleeve and mounted therein, a tillage element, means for connecting the tillage element with the extension arm, and means for clamping the socket around the sleeve.

19. In a tillage implement, a beam, a head connected to the rear end thereof and having a rearwardly extending lug with upper and lower lips and other lips at its top and bottom adjacent to the first named lips, a standard extending forwardly alongside the lug and between the lips, and means for securing it in position.

20. In a tillage implement, a beam angular in cross section, a coupling having an internal substantially cylindrical opening, a sleeve mounted in said opening, said sleeve having a substantially cylindrical exterior conforming to the opening and being provided with an opening which is angular in cross section and conforms to and receives the end of the beam, and means for securing the sleeve in the coupling.

21. In a tillage implement, a beam angular in cross section, a coupling having an internal substantially cylindrical opening, a sleeve mounted in said opening, said sleeve having a substantially cylindrical exterior conforming to the opening and being longitudinally divided and formed to provide an axial opening which is angular in cross section and conforms to and receives the end of the beam, the sleeve and beam being also formed with a projection and a recess respectively which engage each other, and means for securing the sleeve in the coupling.

22. In a tillage implement, a cross head for supporting a tillage element, having a plurality of chambers each wider at one side than the other and extending through the head, the wider end of one chamber being adjacent the narrower end of the other, the head also having an apertured diagonal division wall which separates the chambers from each other and openings registering with the aperture in the division wall.

23. In a tillage implement, a cross head for supporting a plurality of tillage elements, having a plurality of chambers at one end and a socket at its other end, each of said chambers being wider at one side than the other and extending through the head, the wider side of one chamber being adjacent the narrower side of the other, the head also having an apertured diagonal division wall which separates the chambers from each other and openings registering with the aperture in the division wall.

24. In a tillage implement, a cross head for supporting a plurality of tillage elements, having a plurality of chambers at one end and also having a rearwardly extending lug having longitudinal flanges, said cross head also having flanges adjacent the flanges of the lugs, each of said chambers being wider at one side than the other and extending through the head, the wider side of one chamber being adjacent the narrower side of the other, the head also having an apertured diagonal division wall which separates the chambers from each other and openings registering with the aperture in the division wall.

25. In a tillage implement, a cross head for supporting a series of tillage elements, having a plurality of chambers at one end, a socket at its other end and a rearwardly extending lug between its ends, said lug having flanges at its top and bottom, the cross head also having flanges adjacent the flanges of the lugs, and each of said chambers being wider at one side than the other and extending through the head, the wider side of one chamber being adjacent the narrower side of the other, the head also having an apertured diagonal division wall which separates the chambers from each other and openings registering with the aperture in the division wall.

In testimony whereof I affix my signature in the presence of two witnesses.

CHARLES T. RAY.

Witnesses:
 WM. M. JOHNSTON,
 J. A. HOOVER.

Copies of this patent may be obtained for five cents each, by addressing the "Commissioner of Patents. Washington, D. C."